United States Patent Office 3,523,665
Patented Aug. 11, 1970

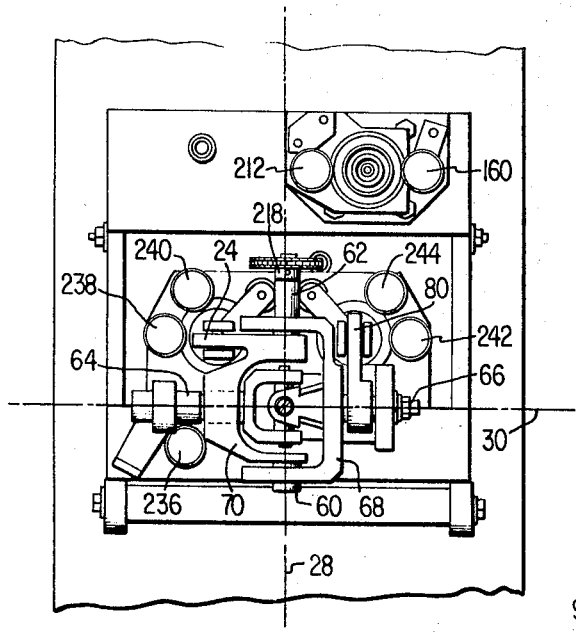
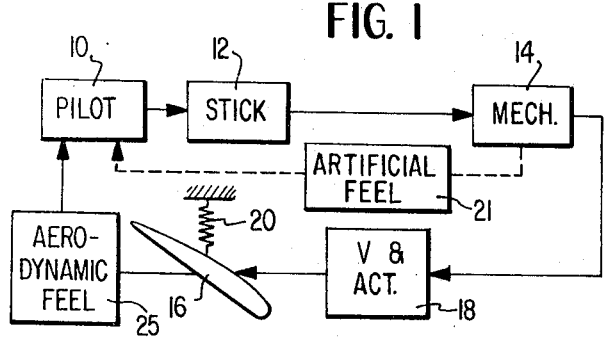
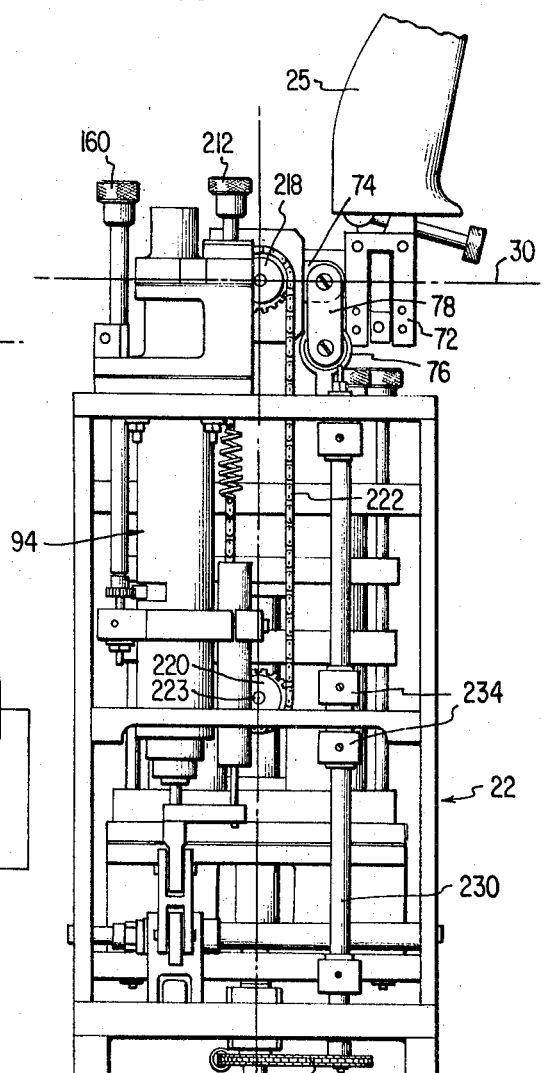
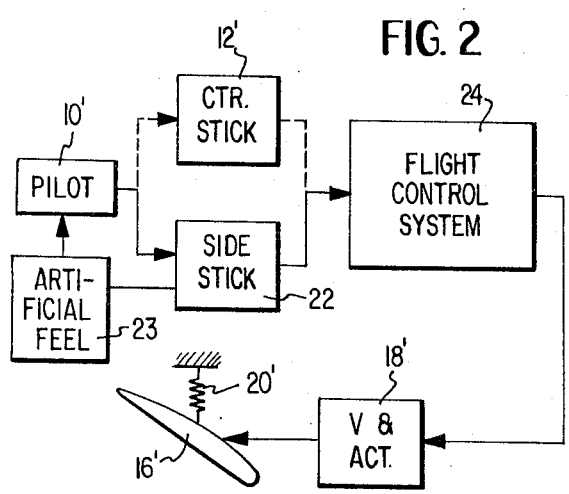
INVENTORS.
WILLIAM G. LAYNOR, JR.
DEAN S. MONITOR
ATTORNEYS

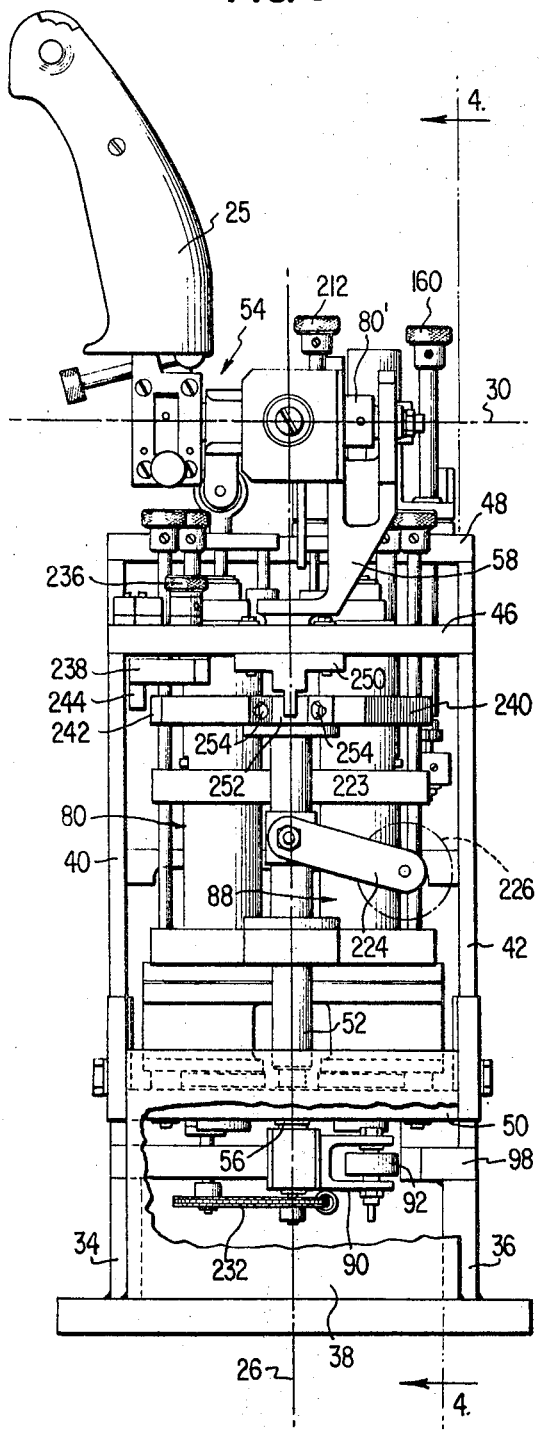
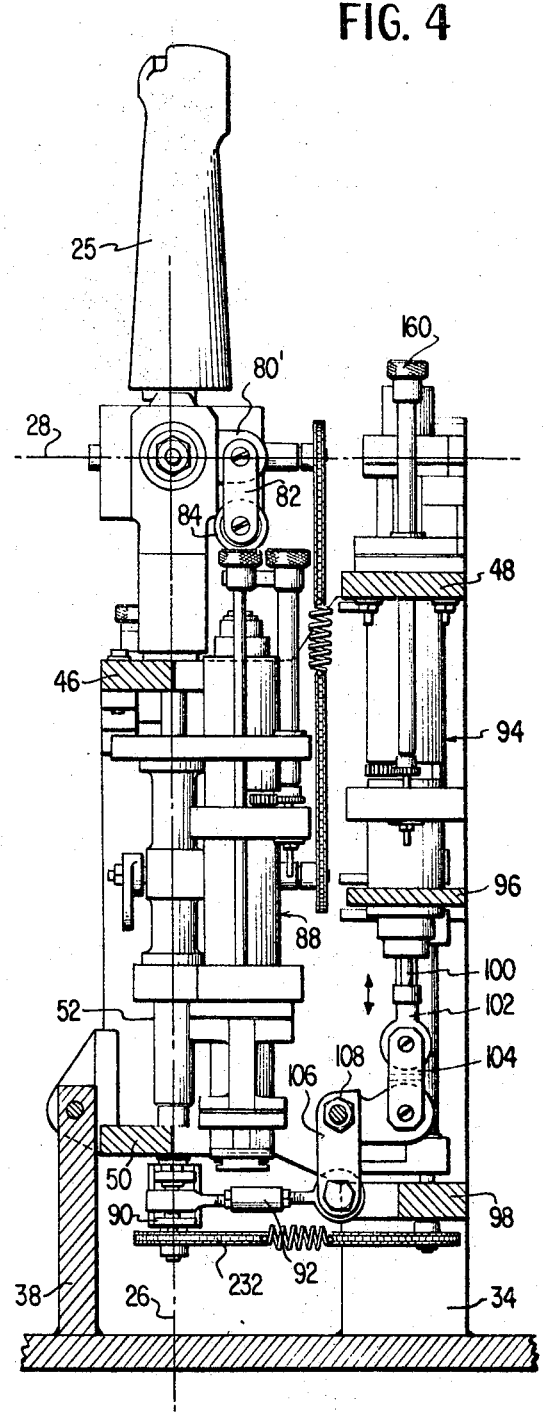

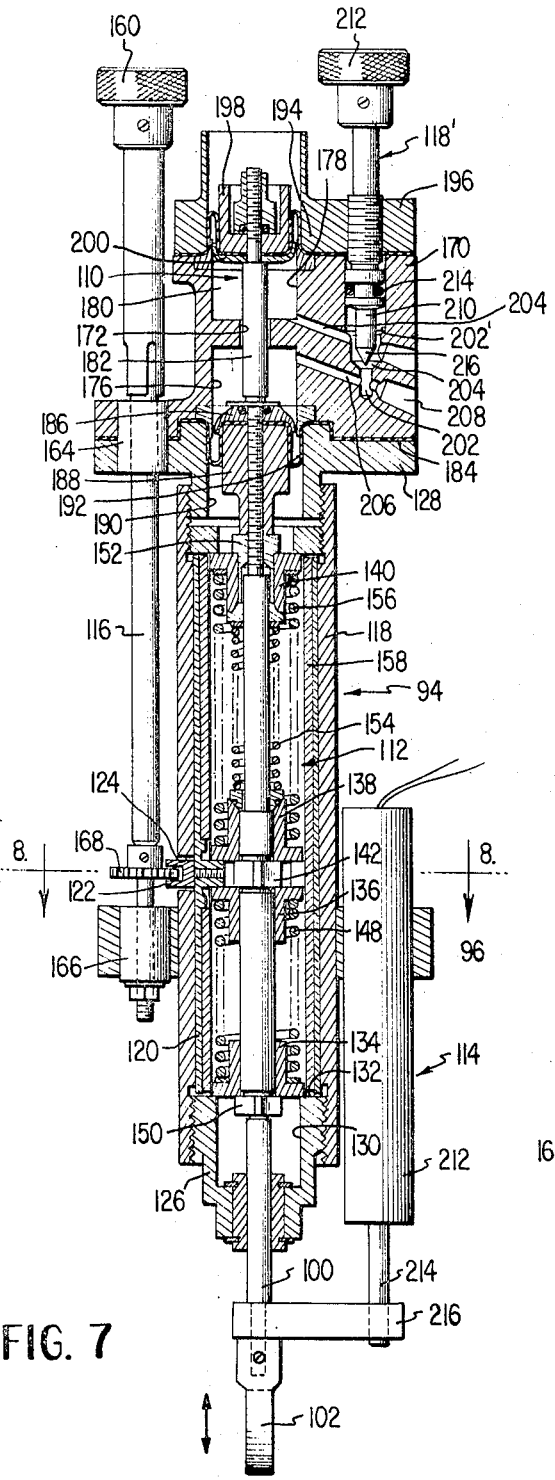

3,523,665
SIDE STICK
William G. Laynor, Jr., Baltimore, and Dean S. Monitor, Cockeysville, Md., assignors to Martin Marietta Corporation, New York, N.Y., a corporation of Maryland
Filed Feb. 19, 1968, Ser. No. 706,275
Int. Cl. B64c 13/46
U.S. Cl. 244—83　　　　　　　　　　　　　　　10 Claims

ABSTRACT OF THE DISCLOSURE

Three axis controller which provides electrical outputs proportional to controller displacement for an aircraft having a fly-by-wire control system. The unit further provides for simple, in-flight pilot adjustment of artificial feel, breakout force and controller damping.

---

Since the advent of powered aircraft, aircraft control has been achieved in the most part through the use of a multiplex axis control stick centrally located and operated by the pilot. The movement of the control stick is translated to the aircraft movable control surface by either a purely mechanical, or a combined mechanical and hydraulic actuator system. Controls of this type are broadly known as a mechanical or power operated aircraft control system. Reference to FIG. 1 of the drawings discloses, in block diagram form, the basic components for one such system. The pilot 10 physically moves the stick 12 which is coupled by mechanical means 14, such as pushrods or cables, directly to the movable aircraft control surface member 16, in this case, through a hydraulic valve and actuator element 18. In the most simplified case, element 18 would be eliminated and the end of the linkage remote from stick 12 would effect movement of the movable surface 16 about its pivot axis and against the bias of spring means 20 which tends to maintain airfoil 16 in a neutral position.

In more recent times, the purely mechanical and the mechanical and hydraulic systems have been supplanted by multiple axis controllers in which electrical signals, initiated by movement of the pilot operated stick, are transmitted electrically or electronically to the remote airfoil, in which case, the associated hydraulic valve and actuator are controlled by the electrical signal upon receipt thereof. Since there is no direct mechanical connection between the control surface and the controller, this type of system isolates, from the pilot, the feel provided by the resistance of the airfoil to movement from its neutral position, although the pilot is still subjected to aerodynamic feel 25. The absence of feel through the controller may result in overcontrol, that is, movement of the controller to a greater extent that that required to maintain or change the attitude of the aircraft to the extent desired by the pilot.

Various attempts have been made to introduce an artificial feel into a multiple axis controller for fly-by-wire aircraft. Conventionally, angular acceleration feedback, spring feedback or dynamic sensor feedback is employed to create artificial feel. This is shown in dotted line form at 21 in the block diagram of FIG. 1.

In addition to a lack of resistance or feel, the lack of mechanical connection between the airfoil and the stick also creates the problem of maintaining the controller or stick in a neutral position with respect to the multiple axis movement. Essentially, in a pure mechanical system, the biasing means, such as spring 20, would cause the airfoil 16 and thus the stick, to move into neutral position, assuming, of course, that the valve and actuator mechanism 18 were removed. Again, attempts have been made to employ force generating mechanisms carried by the controller which ensures, subsequent to movement of the stick or controller from a neutral position, the resetting of the same subsequent to physical release by the pilot. Since the pilot constitutes a human being whose physical characteristics vary, depending upon the aircraft, it is desirable to provide some means for adjusting controller forces and damping to the individual pilot or aircraft. A controller having fixed characteristics may not only be unsatisfactory when applied to a different aircraft, but also when applied to a different pilot.

Finally, since the force generating mechanism tends to maintain the controller in the neutral or null position for all axes, it is desirable to provide some type of initial resistance to controller movement from the null position. The force required to overcome this resistance is known as the "breakout force." Again, due to the different characteristics of the various aircraft and the variation in physical makeup of the pilots operating the aircraft, it is desirable to vary the breakout force required to overcome the resistance of the controller to movement from its null position.

In the past, the artificial resistance or feel, the breakout force and the controller damping characteristics have been adjusted and set during manufacture of the aircraft, or at various times when the aircraft is not in operation, by the ground maintenance personnel.

It is, therefore, a principal object of this invention to provide a multiple axis control for a fly-by-wire aircraft in which the pilot, while in flight, may readily and simply adjust the artificial feel, the breakout and the damping of the controller.

It is a further object of this invention to provide an improved controller of this type which may readily provide individual three axis electrical outputs, proportional to controller displacement, without in any way interfering with the in-flight adjustment capabilities of the controller.

It is a further object of this invention to provide an improved controller of this type in which change from two axes to three axes control may be achieved in flight, at the option of the pilot.

It is a further object of this invention to provide an improved controller of this type in which artificial feel is achieved by completely passive means.

It is a further object of this invention to provide an improved, in-flight adjustable controller of this type in which the pilot may readily select any one of three discrete force gradients and corresponding breakout forces for each of the three operating axes and may readily achieve infinite variation in controller damping of movement about each axis.

Other objects of this invention will be pointed out in the following detailed description and claims and illustrated in the accompanying drawings, which disclose, by way of example, the principle of the invention and the best mode which as been contemplated of applying that principle.

In the drawings:

FIG. 1 is a block diagram of a conventional, mechanical and power operated aircraft control system;

FIG. 2 is a block diagram of a proposed "fly-by-wire" aircraft control system employing the improved side stick controller of the present invention;

FIG. 3 is a side elevational view of the side stick controller of the present invention in preferred form;

FIG. 4 is a rear elevational view of the controller as shown in FIG. 3;

FIG. 5 is a top plan view of the controller shown in FIGS. 3 and 4;

FIG. 6 is an elevational view of the controller from the side opposite that of FIG. 3;

FIG. 7 is a sectional view of the yaw axis feel-damper cartridge forming a portion of the controller shown in FIGS. 1 through 6;

FIG. 8 is a sectional view of a portion of the feel-damper cartridge shown in FIG. 7 taken about lines 8—8, with the sector gear in a first position, and FIG. 9 is the same sectional view as FIG. 8 with the sector gear rotated to a second position.

SUMMARY OF THE INVENTION

In general, the present invention is directed to a multiple axis stick controller for a fly-by-wire aircraft including a pilot operated motion transmitting member mounted for independent rotation about at least two intersecting axes. Passive artificial feel means are carried by the controller for providing resistance to manual movement of the transmitting member from a reference position about multiple axes. In-flight adjustment means are also carried by the controller to vary the resistance level of the same. In a three axis controller, mechanical lock-out means selectively prevent movement of the motion transmitting member about one of the axes. Damper means are provided for damping movement of the motion transmitting member to and from the reference position and in-flight adjustment means are further carried by the controller allowing the pilot to vary the damping rate.

Preferably, separate axes feel-damper cartridges are carried by the controller with hand grip motion transmitted to the respective cartridge shafts. A plurality of selectively actuated springs of different spring constant are coupled to the shaft in additive fashion to increase the spring gradient resistance to controller hand grip movement. The separate feel-damper cartridges are carried by the controller in spaced, parallel alignment with the manual in-flight adjustment means carried at common ends of the cartridges.

The present invention, in preferred form is identified as side stick or controller 22 in the block diagram of FIG. 2. Referring to FIG. 2, it is noted that the pilot 10' may selectively control the position of airfoil 16' or other control surface through either the conventional control stick 12' (shown in dotted line fashion) or alternatively, through side stick 22. In this case, electrical signals from either control stick 12' or side stick 22 are directed to the hydraulic valve and actuator means 18' by the flight control system identified as block 24. Insofar as the present invention is concerned, it is important only to note that the side stick 22 may be selectively coupled (as shown) into a conventional system, but it would actually be substituted for the standard control stick 12' to move airfoil 16' against the air loads 20'.

The side stick controller 22 is a highly compact, essentially mechanical passive type of apparatus for providing electrical output signals which are proportional to the angular displacement of the pilot operated controller handgrip 25 about the three conventional aircraft control axis, that is, pitch, roll and yaw. Insofar as controller 22 is concerned, the yaw axis is indicated at 26 (FIG. 6), the pitch axis 28 and the roll axis 30 (FIG. 5). The controller includes, when oriented as shown, a horizontal base plate or support member 32 which carries front and rear vertical support members 34 and 36, respectively, and a side support member 38 which extends thereacross. Assuming the pilot is sitting behind the rear of the unit, facing support member 36, FIG. 3 is, therefore, a left side view, while FIG. 6 is a right side view of the unit as positioned within the aircraft. A front plate extension 40 and a rear plate extension 42 extend upwardly and act to support a left-hand top plate 46 and a right-hand top plate 48 with the left-hand plate 46 being disposed slightly below right-hand plate 48. The left-hand top plate 46 acts in conjunction with a transverse support plate 50 to support and carry the yaw axis shaft 52 to which is coupled, at its upper end, controller handgrip assembly 54, including handgrip 25. In this respect, shaft 52 is suitably mounted on plates 46 and 50 by low friction bearings, such as bearings 56. A bracket 58 provides coupling between the yaw axis shaft 52 and the pitch and the roll axis shaft members. The handgrip assembly 54 includes a universal joint which may be best seen in FIG. 5, for allowing multiple axis displacement of the handgrip 25 about the pitch axis 28, defined by pitch axis shaft segments 60 and 62, and right angle roll axis 30, defined by roll axis shaft segments 64 and 66. Movement of the handgrip 25 about either axis does not, of course, interfere with rotation of the handgrip assembly 54 about the yaw axis 26.

With regard to the universal joint, bracket member 58 carries shaft segment 66 on rigidly coupled U-shaped member 68. The U-shaped member 68 receives pivotably pitch axis segments 60 and 62 which rotatably support a second U-shaped member 70 having arms which are internally received within the arms of the U-shaped member 68. U-shaped member 70 is rigidly coupled to the roll axis shaft segment 64 and handgrip 24 is rigidly coupled thereto by mechanism 72. Coupling mechanism 72 allows mechanical disassembly of the handgrip 25 from the controller. Rotation of U-shaped universal member 70 about pitch axis 28, that is, pitch shaft segments 60 and 62, causes arm 74 to oscillate about the pitch axis 28. Arm 74 is coupled to the upper end 76 of pitch axis feel-damper cartridge actuator shaft by link member 78 (FIG. 6). The pitch axis force generating mechanism, hereafter referred to as feel-damper cartridge 80, is vertically oriented and rigidly coupled to transverse plates 46 and 50 by suitable mounting means.

It is important to note that in the controller 22, rotational movements of the handgrip 25 about the pitch, roll and yaw axes are individually translated into vertical displacement of respective feel-damper cartridge shafts. Movement of the handgrip 25 about the roll axis 30, as defined by the roll axis shaft elements 64 and 66, causes U-shaped member 68 of the universal joint to oscillate arm 80' (FIG. 4), which movement is carried to an upper end 84 of roll axis feel-damper cartridge actuator shaft (FIG. 4) through link 82. In this respect, the roll axis feel-damper cartridge 88 is positioned adjacent to and parallel with the pitch axis feel-damper cartridge 80. Again, the roll axis feel-damper cartridge 88 is rigidly carried by the controller 22 by being coupled to transverse support plates 46 and 50.

Turning next to the translation of rotation of the handgrip assembly 54 about the yaw axis 26, it is noted that such rotation is translated by the bracket member 58 directly to shaft 52. At the bottom of the assembly, shaft 52 carries a radially extending arm 90, to which is pivotally coupled a link member 92. As shown in FIG. 4, on the right side of the assembly, the yaw axis feel-damper cartridge 94 is rigidly coupled to the controller in vertical, parallel relationship to cartridges 80 and 88. The cartridge 94 is supported by transverse top plate 48, and intermediate plate 96. Of course, the means for rigidly supporting the cartridges, etc., may be readily varied to suit the specific needs of the unit, and one of these support plates may be readily eliminated. Cartridge 94 is oriented opposite to cartridges 80 and 88, that is, shaft 100 of the yaw axis feel-damper cartridge extends downwardly from the bottom of the cartridge assembly with its bottom end 102 being coupled by means of link 104 to a pivotally mounted L-shaped, motion transfer lever 106. Lever 106 is pivotally coupled to the assembly by shaft 108. The other end of the L-shaped lever 106 is pivotally coupled to link 92 such that rotation of shaft 52 about yaw axis 38 is translated into vertical oscillation of shaft 100 as is indicated by the arrow (FIG. 4).

From the above description, it is seen that stick controller displacement in each axis is transmitted through mechanical linkage to respective feel-damper cartridges. The universal coupling, which is used to separate pitch and roll motion, is essential to the design to allow the parallel placement of the three feel-damper cartridges, thus limiting the required packaging envelope. The feel-damper cartridges are essentially identical for each axis and are designed to provide positive centering of the stick handgrip 25 to a position corresponding to zero electrical output, to provide artificial feel, that is, a force directly proportional to stick displacement and to provide viscous dampening.

For the purpose of simplification, only the yaw axis feel-damper cartridge 94 is shown in detail, although the roll and pitch axis cartridges are identical, with the exception that the mechanical adjusting means for in-flight adjustment of feel, damping and breakout force are carried at the same end of the cartridge as the cartridge shaft coupling.

Referring to FIG. 7, the yaw axis feel-damper cartridge 94 is shown as removed from the controller assembly and constitutes, as a unitary package, a fluid damper section 110 at the top, a bottom portion 112 providing artificial feel to the pilot, an associated electrical signal producing element in the form of potentiometer 114, pilot operated feel adjustment shaft 116 operated by knob 160 and pilot operated damper adjustment shaft 118 operated by knob 212. The cartridge 94 occupies the position shown when fixed to the controller 22. In this regard, the end 102 of cartridge input shaft 100 is caused to oscillate vertically as shown by the arrow (FIG. 7), causing the elements carried by the shaft to be displaced from the null position shown. The cartridge includes an outer cylindrical casing 118. The casing 118 carries a rotatable sleeve 120, the sleeve including a sector gear 122 which protrudes from slot opening 124 within casing 118. The ends of casing 118 are threaded. A threaded bushing 126 is carried at the bottom end of casing 118 and an annular flanged end wall 128 is carried at the opposite end. The bushing member 126 is counterbored at 130 to form an edge 132, which acts as a limit stop for spring retainer member 134. In this respect, spring retaining members 134, 136, 138 and 140 are carried by the rotatable inner sleeve 120 with the spring retainers being splined relative to the actuating shaft 100.

For instance, with respect to spring retainer 136, the shaft 100 is provided with a section 142 which is star-shaped in cross-section (FIG. 8). Section 122, which is rigidly coupled to the inner cylinder 120, in rotating, causes the teeth or projections 146 of the spring retainer 136 to selectively underlie the teeth or projections 144 of the shaft star-shaped section 142. As indicated in FIG. 9, with the projections 144 and 146 in axial abutting relationship, movement of shaft 100 in a downward axial direction will cause compression of coil spring 148 which is captured between the spring retainer members 134 and 136. Shaft 100 is provided with a second spline section 150 at the lower end of shaft 100 cooperating with spring retainer 134 and an upper spline section 152 which co-operates with upper spring retainer 140. Spline section 142 is operatively coupled to either spring retainer 136 (simultaneously coupling spline section 150 to retainer 134) or 138 (simultaneously coupling spline section 152 to retainer 140), or neither depending upon the position of inner sleeve 120. In addition to compression spring 148, there is provided a coil spring 154 of lesser spring constant concentrically positioned within yet a third coil spring 156. It is to be noted that coil spring 154 is in constant abutment with opposed ends of spring retainer 140 and spring retainer 138 such that regardless of the angular position of the rotatable inner sleeve 120, any axial movement of actuating shaft 100 from the null position will cause axial compression of coil spring 154, providing a first degree of feel or resistance to controller movement about the yaw axis. The selective in-flight adjustment of controller feel is achieved by manual rotation of sector gear 122 by the pilot. In this respect, the yaw axis cartridge feel adjustment knob 160 is carried at the upper end of feel adjustment shaft 116, the adjustment shaft being rotatably positioned on the assembly by spaced bearings 164 and 166. The shaft 116 carries a pinion gear 168 which is in mesh with sector gear 122. Thus, rotation of the control knob 160 causes rotation of pinion gear 168 and limited rotation of sector gear 122 to displace the inner cylinder 120 angularly with respect to actuator shaft 100. The device is so constructed, that a 30 degree movement of the retainers, since they all rotate with the inner sleeve, results in engagement of a tooth or projection on the actuating shaft with a projection or tooth on the spring retainer to cause, under axial shift of actuator shaft 100, compression of a second spring in addition to the constantly available compression spring 154. In the present design, a 30 degree rotation of pinion 168 and sector gear 122 will cause axial alignment and engagement between a tooth or projection carried by both spring retainer 138 and spring retainer 140 with respective shaft spline sections 142 and 152. During subsequent axial shaft movement in either direction, the compression spring 156 will be compressed in addition to spring 154, in which case, the artificial feel or resistance to movement of the controller will be at an increased spring gradient level. When the sector gear 122 has been moved, as indicated in FIG. 9, 60° from its initial position, teeth or projections 144 and 146 of the shaft and spring retainer 136 will be in axially abutting position. Likewise, the same is true for spline section 150 of the actuator shaft 100 and its associated spring retainer 134. Thus, shaft 100, moving in either direction from its null position, in this case will compress, in addition to springs 154 and 156, coil spring 148 and thus, increase the spring gradient level to its maximum. Adjustment is achieved by rotating the adjustment shaft 116 in a clockwise direction when viewed from above, as indicated by the arrow in FIG. 9. The centering of the shaft with respect to the compression spring and adjusting the breakout force is achieved by preloading the springs during bench assembly This is achieved by means of the threaded couplings 126 and 128 occurring at both ends of the outer cylindrical casing 118.

The second major component of each feel-damping cartridge is the fluid damper section. In the case of the yaw axis cartridge 94, the fluid damper section 110 comprises a formed casing or housing 170 which is bored at 172 to receive shaft extension 174 and counterbored at 176 and 178 to form opposed hydraulic damping chambers 180 and 182. A roll seal is provided at the lower end of the shaft extension 174, the seal being formed by a flexible diaphragm 184 which is sandwiched on shaft 100 by threaded members 186 and 188, respectively. Member 188 is of lesser diameter than bore 190 formed within the end wall of coupling 128, such that a portion 192 of the diaphragm 184 is convoluted between members 188 and 128 with the diaphragm in contact with respective walls and rolling on itself as the actuating shaft 100 moves up and down. Shaft extension 174, therefore, moves axially with respect to bore 172, and an apropriate seal carried by the bore 172 for preventing fluid communication between damping chambers 180 and 182 in this area. An upper diaphragm 194 provides, in conjunction with members 170, 196, 198 and 200, a similar type rolling seal for the upper damping chamber 187. Casing 170 is further provided with a spaced vertical bore 202 which extends partially through the casing from the upper end thereof. Transverse passages 204 and 206 extend outwardly from damper chambers 182 and 180, respectively. Threaded plugs (not shown) close off the outer ends 208 of passages 204 and 206 remote from the area of intersection with vertical bore 202. The bore 202 is counterbored at 202' intermediate of the two passages 204 and 206 in such a manner as to form a tapered valve seat 209. A needle 210 is carried by casing 170 within counterbore 202' and is threadedly received by member 196. A control knob 118' is carried at the end of the needle and an appropriate O-ring seal 214 prevents fluid escape from the counterbore 202'. Again, in-flight pilot adjustment of damper section 110 is achieved by varying the size of the orifice created by needle valve tip 216 and tapered valve seat 209.

In conventional fluid damper fashion, a hydraulic fluid is carried by chambers 180 and 182 with the fluid able to travel through the transverse passages 204 and 206 and through the adjustable orifice in response to actuator shaft movement. Assuming, for instance, that the chambers and passageways are filled with hydraulic fluid, movement of the actuator shaft upwardly causes a reduction in volume of chamber 182 and an increase in volume of chamber 180. Fluid is, therefore, forced from chamber 182 into transverse passage 206, through the orifice, around the needle tip 216 into transverse passage 204 and into now expanding chamber 180. There is not only fluid restraint to movement of the actuator shaft when displaced in a positive manner by the pilot, but upon release of the handgrip 25, the movement of the actuator shaft 100 back to a null position under the spring bias in a reverse direction, is fluid damped in the same manner.

The pilot may take independent in-flight adjustment of knobs 160 and 212 to increase or reduce the artificial feel, or resistance movement of the handgrip and/or increase or decrease of the damping rate of the stick controller. Damping is, therefore, readily achieved by moving fluid through an orifice with the actuating shaft motion. The area of the annular orifice is varied by threading the needle 210 in or out of the housing 170, thus allowing an adjustment of damping coefficient.

A proportional electrical output is provided by a linear potentiometer 114 which, for instance, has a casing section 212 fixed to cartridge 94 and a movable contact carried by shaft 214 which is rigidly coupled to the actuating shaft 100 by a transverse connecting member 216. A variable differential transformer may be substituted for the potentiometer which is normally mounted in parallel with the feel-damper cartridge as shown.

The stick controller of the present invention is applicable to high performance aircraft and spacecraft. In order to prevent acceleration loads from exceeding the minimum breakout force for any given axis, the stick control is provided with means for transmitting handgrip displacement mechanically to balancing arms for each axis. For instance, referring to FIGS. 3 and 4, it is noted that the pitch axis shaft element 62 carries a sprocket wheel 218 which is vertically aligned with a driven sprocket wheel 220 further down on the assembly. A spring coupled chain 222 causes rotation of the driven sprocket wheel 220. The sprocket wheel 220 is mounted for rotation on a shaft 223 which carries, at its opposite end, a pitch axis balance form 224. A balance weight indicated in dotted line fashion at 226 is attached to the arm radially of the shaft axis such that any acceleration tending to rotate the controller about the pitch axis in one direction will be resisted by a tendency to rotate the balance arm and weight about the axis of shaft 223 in the opposite direction.

With respect to the roll axis 30, and the yaw axis 26, similar means are applied for placing a balancing arm and weight of appropriate mass in such a position and operatively coupled to the handgrip, such that accelerations acting simultaneously on the handgrip 25 and its movable element and the balancing arms, cancel themselves out. For the yaw axis (FIG. 6), it is noted that shaft 52, and auxiliary balancing arm shaft 230 are operatively coupled for simultaneous rotation by a spring-biased chain 232 carried by suitable sprocket wheels at the bottom ends of these shafts. Thus, one or more balancing arms 234 (FIG. 4) carrying weights (not shown), will act in opposition to handgrip assembly 54 in response to accelerations about the yaw axis.

As stated previously, the pitch axis feel-damper cartridge 80 and the roll axis feel-damper cartridge 88 function identically to the yaw axis feel-damper cartridge. All in-flight adjustments are made by the pilot since the control knobs for all three cartridges extend upwardly from the top of the controller 22. Reference to FIGURE 5 shows, in addition to control knob 236, which selectively locks out movement of the controller handgrip about the yaw axis 26, a pair of pitch axis feel-damper cartridge control knobs 238 and 240. Rotation of control knob 238 adjusts the feel of the controller about the pitch axis by varying the applied spring gradient of cartridge 80. Rotation of control knob 240 changes the damping coefficient of the same cartridge. In like manner, on the opposite side of the pitch axis 28, there is provided a pair of control knobs 242 and 244. These knobs are associated with the roll axis feel-damper cartridge 88, in which case, rotation of control knob 242 varies the coefficient of damping of the cartridge damper section while rotation of control knob 244 changes controller feel for movement about the roll axis 30.

A further feature of the stick controller is the means for selectively locking out the yaw axis controller movement. In this regard, the transverse top plate 46 carries the rotatable manual adjustment knob 236 which is supported at one end of a shaft passing through plate 46, the bottom end of the shaft being coupled to an L-shaped latch member 238. The yaw shaft 52 carries, just beneath transverse plate 46, a disc member 240 which includes a peripheral groove 242. By rotating the hand-operated knob 236, the protruding tip 244 of the latch 238 moves into the groove 242 to prevent further rotation of yaw axis shaft 52 and the handgrip assembly 54 carried thereby. The failure of yaw axis shaft 52 to rotate and bracket 58, does not, of course, interfere in any way with movement of the handgrip 25 about either the pitch or roll axes.

Rotation of the handgrip assembly 54 about all three axes is limited by mechanical stops which control the extent of rotation about any axis from the null position to a predetermined limit position in either direction. For instance, reference to FIG. 3 shows a stop mechanism in the form of a fixed T-shaped element 250 fixed to the underside of transverse top plate 46, the tip of which is received within a second peripheral recess or groove 252 carried by the disc 240 which rotates about the yaw axis 26 on shaft 52. Adjustable screws 254 on either side wall of the recess 252 define the extent of the angular movement of the yaw axis shaft 52. The limits of angular movement of the handgrip assembly about all three axes are well within the operating range of the actuating shafts for the respective feel-damper cartridges. Thus, the physical stops associated with the various pitch, roll and yaw axes shafts of the controller will limit the resultant axial movement of the actuator shaft to ensure that none of the feel section coil springs will bottom out during controller use. In a similar manner, the universal joint associated with handgrip assembly 54 includes positive stops for preventing undue rotation of the controller handgrip in either direction about the pitch and roll axes.

The side stick controller 22 may be used on high performance, piloted aircraft or aerospace vehicles. Potentiometers or their equivalent, provide electrical outputs proportional to stick displacement in each of the three axes of motion. The electrical output signals may be applied to the aircraft or space vehicle power operated control system to thus provide pilot control about each of the three primary axes of motion; pitch, roll and yaw. The three axis controller of the present invention, which is of limited size, may be readily installed by the pilot's side console in existing aircraft and employed in conjunction with a completely power operated control system to allow much more latitude in cockpit design than with the conventional centrally located aircraft control stick. The controller allows the pilot to make in-flight selection of any one of three discrete force gradients and corresponding breakout forces while enabling the pilot to independently vary controller damping for all three axes. The third axis may be readily locked out and all characteristics may be changed without either disassembly or removal of the unit from the vehicle.

While the invention has been particularly shown and described with reference to a preferred embodiment, it will be understood by those skilled in the art that the foregoing and other changes in form and details may be made therein without departing from the spirit and scope of the invention.

What is claimed is:

1. In a multiple axis stick controller for including a manually operated motion transmitting member and means for mounting said member for independent rotation about at least two intersecting axes, the improvement comprising: passive artificial feel means for providing resistance to manual movement of said transmitting member from a reference position, damper means for damping movement of said transmitting member to and from said reference position, and in-flight adjustment means for varying both the resistance level of said feel means and the damping coefficient of said damping means.

2. The controller as claimed in claim 1 further including mechanical lock-out means for preventing movement of said motion transmitting member about one of said axes.

3. An improved adjustable mechanical movement resistance generating cartridge comprising: an axially movable actuator shaft, a plurality of selectively actuated springs of different spring constant carried by said cartridge for resisting movement of said shaft relative to said cartridge body, and adjustment means carried by said cartridge for selectively coupling said shaft and respective springs in additive fashion to increase the spring gradient resistance to shaft movement longitudinally of said cartridge.

4. The cartridge as claimed in claim 3 further including fluid damping means carried by said cartridge and operatively coupled to said actuator shaft for damping movement of said shaft relative to said cartridge, and manually operated adjustment means carried by said cartridge for selectively and independently changing the damping coefficient of said cartridge carrying damping means.

5. The cartridge as claimed in claim 4 wherein; said plurality of selectable springs comprises a number of coil springs, concentrically positioned on said actuator shaft within said cartridge, coil spring retainers at each end of said springs, spline connections between said coil spring retainers and said shaft, and wherein; said manual adjustment means carried by said cartridge includes means for rotating said spline spring retainers relative to said shaft to ensure, on subsequent axial movement of said shaft, axial movement of selected spring retainers to compress associated coil springs and to thereby variably resist movement of said shaft relative to said cartridge body.

6. The cartridge as claimed in claim 5 further including; means for preventing rotation of said actuator shaft relative to said cartridge but allowing axial movement with respect to said cartridge spring retainers at the end of each spring, a rotatable inner sleeve carried by said cartridge, means allowing axial movement of said spring retainers relative to said cartridge but allowing axial movement with with respect thereto, a sector gear carried by the inner sleeve and extending exteriorly of said cartridge, means operatively supporting a pinion gear on said cartridge in mesh with said sector gear, and wherein, said in-flight adjustment means includes means for manually rotating said pinion gear to change the spring gradient level of said cartridge.

7. In a multiple axis stick controller including a manually operated handgrip and means for mounting said handgrip for rotation about orthogonal axes, the improvement comprising: separate feel-damper means for each axis, each feel-damper means including a movable actuator shaft, means for transmitting motion of said handgrip about an axis to its corresponding actuator shaft, passive artificial feel means in the form of a plurality of selectively actuated springs and manually operated, in-flight adjustment means for coupling said shaft and selected springs so as to vary the spring gradient resistance to controller handgrip movement about its corresponding axis, and further including fluid damping means operatively coupled to said actuator shaft for damping movement of said handgrip to and from a controller reference position and manually operated in-flight adjustment means carried by said controller for selectively and independently changing the damping coefficient of any one of said damping means.

8. In a multiple axis stick controller including a manually operated handgrip and means for mounting said handgrip for rotation about orthogonal axes, the improvement comprising: separate feel-damper means for each axis, each feel-damper means including a movable actuator shaft, means for transmitting motion of said handgrip about an axis to its corresponding actuator shaft, passive artificial feel means in the form of a plurality of selectively actuated coil springs concentrically positioned on said actuator shaft, coil spring retainers positioned at each end of each spring, spline connections between said coil spring retainers and said shaft, and manually operated, in-flight adjustment means for coupling said shaft and selected springs so as to vary the spring gradient resistance to controller handgrip movement about its corresponding axis, said manual adjusting means including means for rotating sad spring retainers relative to said shaft to ensure, upon subsequent axial movement of said shaft, axial movement of selected spring retainers to compress associated coil springs to variably resist movement of said controller handgrip about an associated axis of rotation.

9. In a multiple axis stick controller including a manually operated handgrip and means for mounting said handgrip for rotation about orthogonal axes, the improvement comprising: separate feel-damper means for each axis, each feel-damper means including a movable actuator shaft, means for transmitting motion of said handgrip about an axis to its corresponding actuator shaft, passive artificial feel means in the form of a plurality of selectively actuated springs, and manually operated, in-flight adjustment means for coupling said shaft and selected springs so as to vary the spring gradient resistance to controller handgrip movement about its corresponding axis, said in-flight adjustment means including means for preventing rotation of said actuator shaft but allowing axial movement with respect to said spring retainers at the end of said springs, a rotatable sleeve, means allowing axial movement of said spring retainers relative to said rotatable sleeve but preventing rotation with respect thereto, a sector gear carried by said sleeve, and a pinion gear operatively coupled to said sector gear, and means for manually rotating said pinion gear.

10. In a multiple axis stick controller including a manually operated handgrip and means for mounting said handgrip for rotation about orthogonal axes, the improvement comprising: separate feel-damper means for each axis, each feel-damper means including a movable actuator shaft, means for transmitting motion of said handgrip about an axis to its corresponding actuator shaft, passive artificial feel means in the form of a plurality of selectively actuated springs and manually operated, in-flight adjustment means for coupling said shaft and selected springs so as to vary the spring gradient resistance to controller handgrip movement about its corresponding axis, and wherein said separate feel-damper means comprises cartridges in spaced parallel alignment with said in-flight adjustment means carried at common ends thereof.

References Cited

UNITED STATES PATENTS

| | | | |
|---|---|---|---|
| 2,639,108 | 5/1953 | Feeney et al. | 244—83 |
| 2,944,770 | 7/1960 | Datin et al. | 244—83 |
| 3,028,126 | 4/1962 | Holleman | 244—83 |
| 3,409,252 | 11/1968 | Miller | 244—83 |

ANDREW FARRELL, Primary Examiner